(12) United States Patent
Xu

(10) Patent No.: US 10,575,684 B2
(45) Date of Patent: Mar. 3, 2020

(54) MULTIFUNCTIONAL KITCHEN UTENSIL

(71) Applicant: Ziyuan Xu, Hubei (CN)

(72) Inventor: Ziyuan Xu, Hubei (CN)

( * ) Notice: Subject to any disclaimer, the term of this patent is extended or adjusted under 35 U.S.C. 154(b) by 63 days.

(21) Appl. No.: 15/767,652

(22) PCT Filed: Mar. 8, 2017

(86) PCT No.: PCT/CN2017/075977
§ 371 (c)(1),
(2) Date: Apr. 12, 2018

(87) PCT Pub. No.: WO2018/161276
PCT Pub. Date: Sep. 13, 2018

(65) Prior Publication Data
US 2019/0082895 A1 Mar. 21, 2019

(51) Int. Cl.
*A47J 43/28* (2006.01)
*A47J 17/02* (2006.01)

(52) U.S. Cl.
CPC ............ *A47J 43/28* (2013.01); *A47J 17/02* (2013.01)

(58) Field of Classification Search
CPC .. A47J 43/28; A47J 17/02; A47J 17/14; A47J 43/25; A47J 19/04
See application file for complete search history.

(56) References Cited

U.S. PATENT DOCUMENTS

| | | | |
|---|---|---|---|
| 3,589,421 A * | 6/1971 | Locker | A47J 43/25 241/95 |
| 4,307,808 A | 12/1981 | Johnson | |
| 7,222,806 B2 * | 5/2007 | Fornage | A47J 42/04 241/168 |
| 7,946,222 B2 * | 5/2011 | Webb | A47J 19/06 100/234 |
| 8,955,687 B1 * | 2/2015 | Dews | B07B 1/02 209/235 |
| 10,080,382 B2 * | 9/2018 | Ramos | A23N 15/08 |
| 2014/0170282 A1 * | 6/2014 | Cinquini | A47J 17/02 426/482 |
| 2016/0257015 A1 * | 9/2016 | Repac | B26D 1/02 |
| 2017/0280911 A1 * | 10/2017 | Coyle | A47J 17/02 |
| 2019/0082895 A1 * | 3/2019 | Xu | A47J 43/28 |

FOREIGN PATENT DOCUMENTS

| | | |
|---|---|---|
| CN | 202234951 | 5/2012 |
| CN | 105942834 | 9/2016 |
| CN | 206080051 | 4/2017 |
| JP | 2014200667 | 10/2014 |
| KR | 20110066316 | 6/2011 |
| KR | 20150055418 | 5/2015 |

* cited by examiner

*Primary Examiner* — Hwei-Siu C Payer
(74) *Attorney, Agent, or Firm* — JCIPRNET

(57) ABSTRACT

A multifunctional kitchen utensil includes an upper cup body, a lower cup body detachably connected with the upper cup body, an upper hoop part for hooping the upper cup body, a lower hoop part for hooping the lower cup body, an upper handle connected with the upper loop part, a lower handle connected with the lower loop part, a cavity formed by the interior of the upper and lower cup bodies and having a ball therein for processing an ingredient, and a hammer body formed by the exterior of the upper and lower cup bodies. The utensil is capable of easily and rapidly achieving the functions of peeling and making fruit paste.

6 Claims, 5 Drawing Sheets

MULTIFUNCTIONAL KITCHEN UTENSIL

CROSS-REFERENCE TO RELATED APPLICATION

This application is a 371 application of the international PCT application serial no. PCT/CN2017/075977, filed on Mar. 8, 2017. The entirety of the abovementioned patent application is hereby incorporated by reference herein and made a part of this specification.

BACKGROUND OF THE INVENTION

1. Field of the Invention

The invention belongs to the fields of kitchen utensils and in particular relates to a multifunctional kitchen utensil.

2. Description of Related Art

Kitchen utensils which are sold on the market at present are single in function, limited in use function and difficult to clean after being used. In addition, kitchen utensils such as a peeler and a blender are relatively low in speed and inconvenient to operate, and thus are not suitable for the aged, the disabled and children.

SUMMARY OF THE INVENTION

The technical problem to be solved by the invention is to provide a multifunctional kitchen utensil which is capable of peeling and making fruit paste, and is convenient to operate, safe to use and suitable for a wide range of people.

The technical scheme adopted for solving the technical problem of the invention is as follows: the multifunctional kitchen utensil is characterized by comprising:

an upper cup body;

a lower cup body detachably connected with the upper cup body in a sealed way, wherein a cavity for processing an ingredient is formed by the interior of the upper cup body and the lower cup body, and a hammer body is formed by the exterior of the upper cup body and the lower cup body;

an upper hoop part used for sleeving the outer part of the upper cup body and hooping the upper cup body;

a lower hoop part used for sleeving the outer part of the lower cup body and hooping the lower cup body, wherein one end of the lower hoop part is hinged with one end of the upper hoop part;

an upper handle connected with the other end of the upper hoop part;

a lower handle connected with the other end of the lower hoop part, wherein the lower handle and the upper handle jointly form a handle; and a ball arranged in the cavity.

According to the scheme, the upper cup body is made of a rigid material; the kitchen utensil further comprises a soft cushion and a mesh screen which are arranged between the upper cup body and the lower cup body, the cavity comprises an upper cavity arranged between the upper cup body and the soft cushion and used for processing the ingredient, a transition cavity arranged between the soft cushion and the mesh screen and a lower cavity arranged between the mesh screen and the lower cup body and used for storing juice of the ingredient filtered by the mesh screen; and the ball is located in the upper cavity.

According to the scheme, the soft cushion is shaped like an arch which is bulged towards the upper cup body, and the edge of the soft cushion is provided with a pull ring; and the mesh screen is shaped like an arch which is bulged towards the lower cup body, and the edge of the mesh screen is provided with a pull ring.

According to the scheme, the ball is one or a combination of a hollow metal ball, a golf-type ball or a spiky ball.

According to the scheme, the kitchen utensil further comprises a divider, the divider comprises a frame body used for transferring a force, a force-bearing cushion located at the top of the frame body and struck by the hammer body and dividing blades located at the bottom of the frame body, the dividing blades are grids which are connected with one another, and the bottoms of the dividing blades are blunt.

According to the scheme, the frame body is further connected with a holding handle.

The multifunctional kitchen utensil has the beneficial effects that:

1. A peeling function can be achieved by placing the ingredient, such as garlic, required to be peeled and the ball into the cavity together and holding the handle with a hand to shake or randomly strike for several seconds; a fruit paste making function can be achieved by placing soft fruits required to be mashed into paste and the ball into the cavity together and holding the handle with a hand to shake or randomly strike other objects; the upper cup body and the lower cup body are connected with the handle by using the upper hoop part and the lower hoop part which are detachable, so that the multifunctional kitchen utensil is convenient to clean; and the kitchen utensil is not only capable of easily achieving the functions of peeling and making fruit paste, but also free of sharp knife edges, and thus the kitchen utensil is safe, reliable and suitable for a wide range of people.

2. The ingredient required to be mashed into paste and the ball are placed into the upper cavity together, the handle is held with a hand to shake or strike other objects, the ingredient is mashed into paste, and excess juice flows from a gap between the soft cushion and the upper cup body into the transition cavity and is then leaked into the lower cavity from the mesh screen; and the soft cushion and the rigid upper cup body are matched with each other, so that a larger impact force can be brought to the ball, and the effects of making fruit paste from relatively hard fruits and making mashed garlic from relatively hard garlic are better.

3. The soft cushion which is upwards bulged can provide higher elasticity when being in contact with the ball, and the relatively large transition cavity is formed between the soft cushion which is upwards bulged and the mesh screen which is downwards bulged, thereby being capable of accommodating the fruit paste or mashed garlic flowing therein together with the juice and being more convenient for the juice to flow into the lower cavity; and due to the design of the pull rings, the soft cushion and the mesh screen are convenient to dismount, and the phenomenon that the soft cushion and the mesh screen are adsorbed on the upper cup body and the lower cup body after being used is avoided.

4. The balls with different shapes provide different effects, the hollow metal ball has a better effect when being used for peeling, the golf-type ball has a better effect when being used for mashing the mashed garlic, and the spiky ball has a better effect when being used for making the fruit paste.

5. Due to the introduction of the divider, a force for shaking the hammer body in the process of peeling or making the fruit paste and the mashed garlic can be better utilized, different from an existing divider with sharp blades, the divider of the multifunctional kitchen utensil is blunt so as to be very safe for a user, the force-bearing cushion at the top is required to be struck by the hammer body, and the force is transferred to the dividing blades at the bottom by the frame body, so that melons and fruits or vegetables are cut open; due to the combination of the divider and the hammer body, the melons and fruits or the vegetables can be cut open in the process of peeling and making the fruit paste and the mashed garlic, so that the multifunctional kitchen utensil is very convenient and capable of saving labor; the shapes of the grids serving as the dividing blades are not limited, can be same as those of the existing divider and can be further made into various flower shapes, the melons and fruits or the vegetables can be made to be of a personalized style, and the dividing blades can further comprise a plurality of groups of various styles of grids alternately and detachably connected with the frame body.

In the figures, 1—first upper cup body, 2—lower cup body, 3—upper hoop part, 4—lower hoop part, 5—upper handle, 6—lower handle, 7—first ball, 8—second upper cup body, 9—soft cushion, 10—mesh screen, 11—second ball, 12—frame body, 13—dividing blades, 14—force-bearing cushion, 15—holding handle, 16—rotating shaft.

DESCRIPTION OF THE EMBODIMENTS

The invention is further described in detail below in combination with the embodiments and the accompanying drawings.

Embodiment 1

Figure 1:
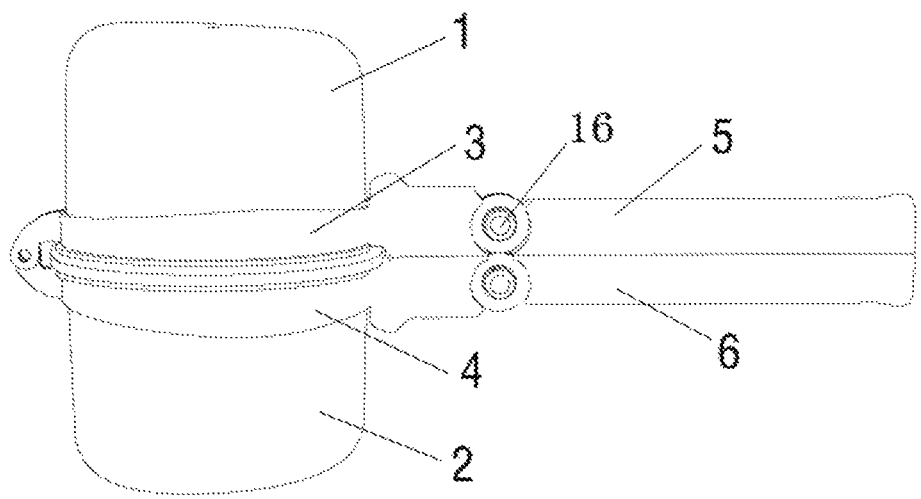
FIG. 1 is a structural schematic diagram of an embodiment of the invention.
Figure 2:
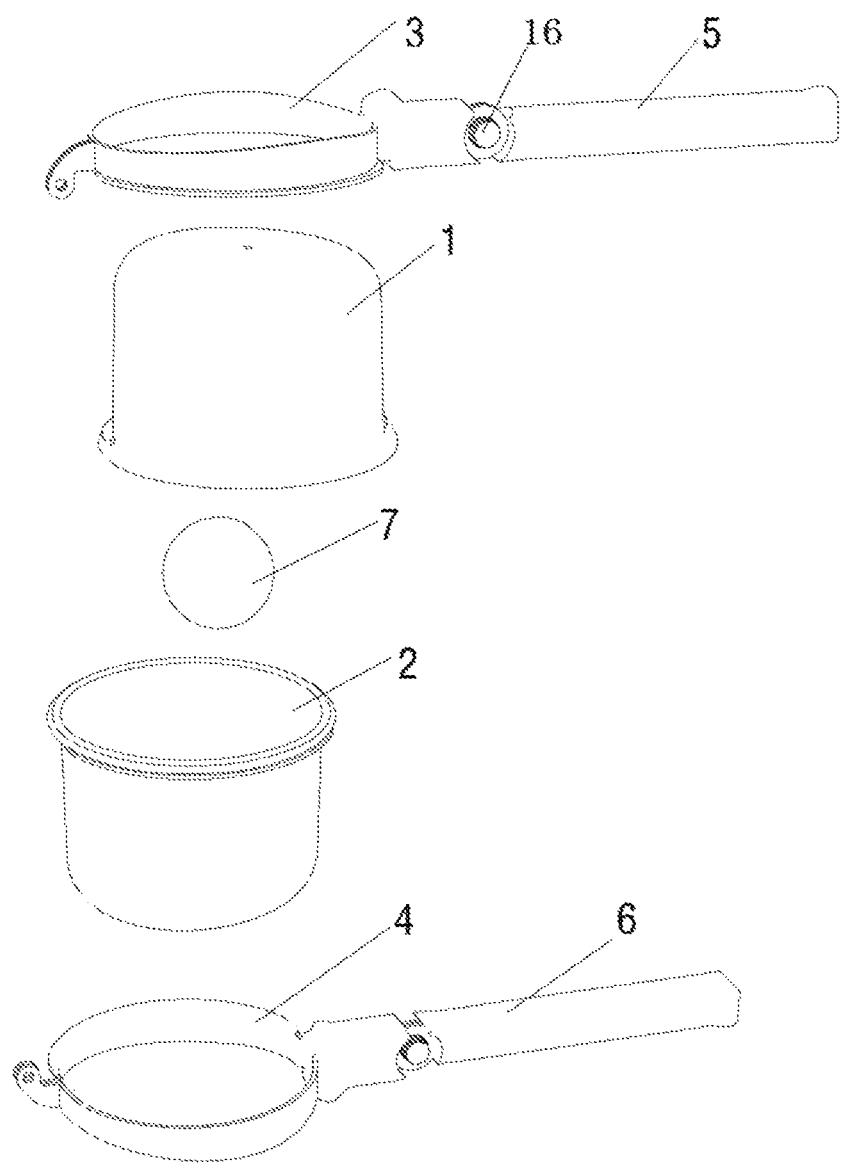
FIG. 2 is an explosive view of FIG. 1.

The invention provides a multifunctional kitchen utensil. Shown as FIG. 1 and FIG. 2, the multifunctional kitchen utensil comprises a first upper cup body 1 and a lower cup body 2; the lower cup body 2 is detachably connected with the first upper cup body 1 in a sealed way; a cavity for processing an ingredient is formed by the interior of the first upper cup body 1 and the lower cup body 2; a hammer body is formed by the exterior of the first upper cup body 1 and the lower cup body 2; the multifunctional kitchen utensil further comprises an upper hoop part 3 used for sleeving the outer part of the first upper cup body 1 and hooping the first upper cup body 1 and a lower hoop part 4 used for sleeving the outer part of the lower cup body 2 and hooping the lower cup body 2, and one end of the lower hoop part 4 is hinged with one end of the upper hoop part 3; the other end of the upper hoop part 3 is connected with an upper handle 5, the other end of the lower hoop part 4 is connected with a lower handle 6, and the lower handle 6 and the upper handle 5 jointly form a handle; and a first ball 7 is arranged in the cavity.

The upper handle 5, the upper hoop part 3, the lower hoop part 4 and the lower handle 6 are connected into a whole and rotate by virtue of a hinged point between the upper hoop part 3 and the lower hoop part 4, during use, the first upper cup body 1 is sleeved with the upper hoop part 3, the lower cup body 2 is sleeved with the lower hoop part 4, garlic to be peeled and the first ball 7 are placed into the lower cup body 2 together, the first upper cup body 1 is closed, the space between the first upper cup body 1 and the lower cup body 2 is sealed, the handle is held with a hand to shake or strike other objects by using the hammer body, and the garlic to be peeled and the first ball 7 are collided in the cavity, so that the effect of peeling the garlic is achieved.

In the embodiment, the upper hoop part 3 is connected with the upper handle 5 by a rotating shaft 16, and the rotating shaft 16 is provided with a limit block, so that an included angle between the upper hook part 3 and the upper handle 5 is in two states, namely 180 degrees and 90 degrees. The connection way between the lower hoop part 4 and the lower handle 6 is same as that between the upper hoop part 3 and the upper handle 5. By using such a connection way, opening and closing are convenient and other parts can be conveniently replaced.

In the embodiment, the first ball 7 is a hollow metal ball and is preferably a hollow stainless steel ball; both the first upper cup body 1 and the lower cup body are made of the same material, namely a food-grade plastic material. The shape of the first upper cup body 1 is same as that of the lower cup body 2, the edge of the first upper cup body 1 is provided with a circle of bulge, and the edge of the lower cup body 2 is provided with a circle of groove matched with the bulge.

Embodiment 2

Figure 3:
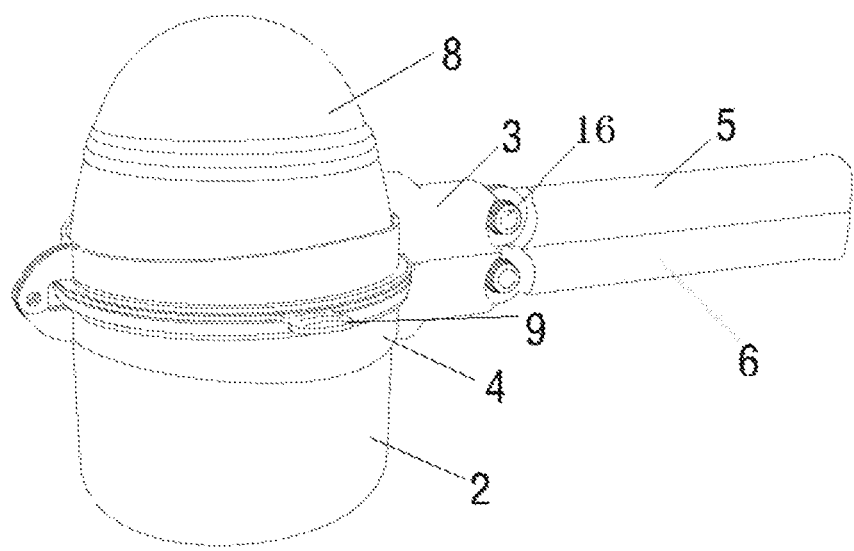
FIG. 3 is a structural schematic diagram of another embodiment of the invention.
Figure 4:
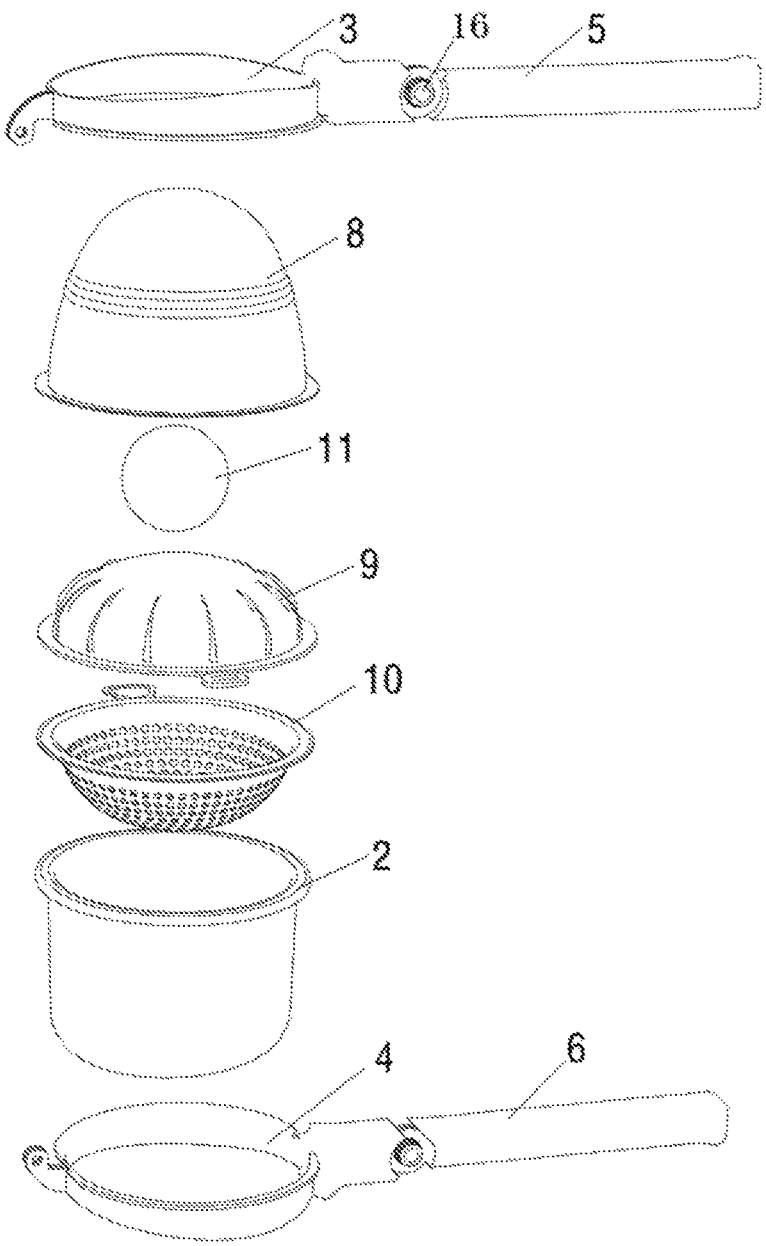
FIG. 4 is an explosive view of FIG. 3.

The invention provides a multifunctional kitchen utensil. Shown as FIG. 3 and FIG. 3, the multifunctional kitchen utensil comprises a second upper cup body 8, a soft cushion 9, a mesh screen 10 and a lower cup body 2; the lower cup body 2 is detachably connected with the second upper cup body 8 in a sealed way; a cavity for processing an ingredient is formed by the interior of the second upper cup body 8 and the lower cup body 2; the cavity comprises an upper cavity arranged between the second upper cup body 8 and the soft cushion 9 and used for processing the ingredient, a transition cavity arranged between the soft cushion 9 and the mesh screen 10 and a lower cavity arranged between the mesh screen 10 and the lower cup body 2 and used for storing juice of the ingredient filtered by the mesh screen 10; a hammer body is formed by the exterior of the second upper cup body 8 and the lower cup body 2; the multifunctional kitchen utensil further comprises an upper hoop part 3 used for sleeving the outer part of the second upper cup body 8 and hooping the second upper cup body 8 and a lower hoop part 4 used for sleeving the outer part of the lower cup body 2 and hooping the lower cup body 2, and one end of the lower hoop part 4 is hinged with one end of the upper hoop part 3; the other end of the upper hoop part 3 is connected with an upper handle 5, the other end of the lower hoop part 4 is connected with a lower handle 6, and the lower handle 6 and the upper handle 5 jointly form a handle; and a second ball 11 is arranged in the upper cavity.

The soft cushion 9 is shaped like an arch which is bulged towards the second upper cup body 8, and the edge of the soft cushion 9 is provided with a pull ring; and the mesh screen 10 is shaped like an arch which is bulged towards the lower cup body 2, and the edge of the mesh screen 10 is provided with a pull ring. The pull rings extend out of the hammer body.

The second ball 11 is a golf-type ball or a spiky ball, or both the golf-type ball and the spiky ball are used as parts, and one of the golf-type ball, the spiky ball, and the combination of the two is selected according to different demands.

The upper handle 5, the upper hoop part 3, the lower hoop part 4 and the lower handle 6 are connected into a whole and rotate by virtue of a hinged point between the upper hoop part 3 and the lower hoop part 4, during use, the second upper cup body 8 is sleeved with the upper hoop part 3, the lower cup body 2 is sleeved with the lower hoop part 4, peeled garlic or fruits to be processed and the second ball 11 are placed into the second upper cup body 8 together, the soft cushion 9 is laid, the arch of the soft cushion 9 faces towards the second upper cup body 8, the mesh screen 10 is placed, the lower cup body 2 is closed, the arch of the mesh screen 10 faces towards the lower cup body 2, the space between the second upper cup body 8 and the lower cup body 2 is sealed, the pull ring of the soft cushion 9 and the pull ring of the mesh screen 10 are separately arranged at the two sides of the hammer body, the handle is held with a hand to shake or strike other objects by using the hammer body, and the peeled garlic or the fruits to be processed and the second ball 11 are collided in the upper cavity, so that the effect of mashing the mashed garlic or making the fruit paste is achieved. According to the types of the fruits and the shaking or striking time, the kitchen utensil can be further used for making fruit juice.

In the embodiment, the second upper cup body 8 is made of a rigid material, preferably, a stainless steel material, the soft cushion is made of a food-grade silicone material, the mesh screen is made of a stainless steel material, and the lower cup body 2 is made of a food-grade plastic material. The second upper cup body 8 is arc-shaped and can be shaped like a semi-ellipsoid, half an egg, a parabola and the like. The lower cup body 2 is shaped like a flat-bottomed cup, and a chamfer is arranged between the bottom and the side of the lower cup body 2. The edge of the second upper cup body 8 is provided with a circle of bulge, and the edge of the lower cup body 2 is provided with a circle of groove matched with the bulge.

Embodiment 3

The embodiment is a combination of the embodiment 1 and the embodiment 2, the first upper cup body 1 and the second upper cup body 8 are used as one of the parts, and the different upper cup bodies are selected when different functions are required; and the first ball 7 and the second ball 11 are used as one of the parts, and the different balls are selected when different functions are required.

Embodiment 4

Figure 5:
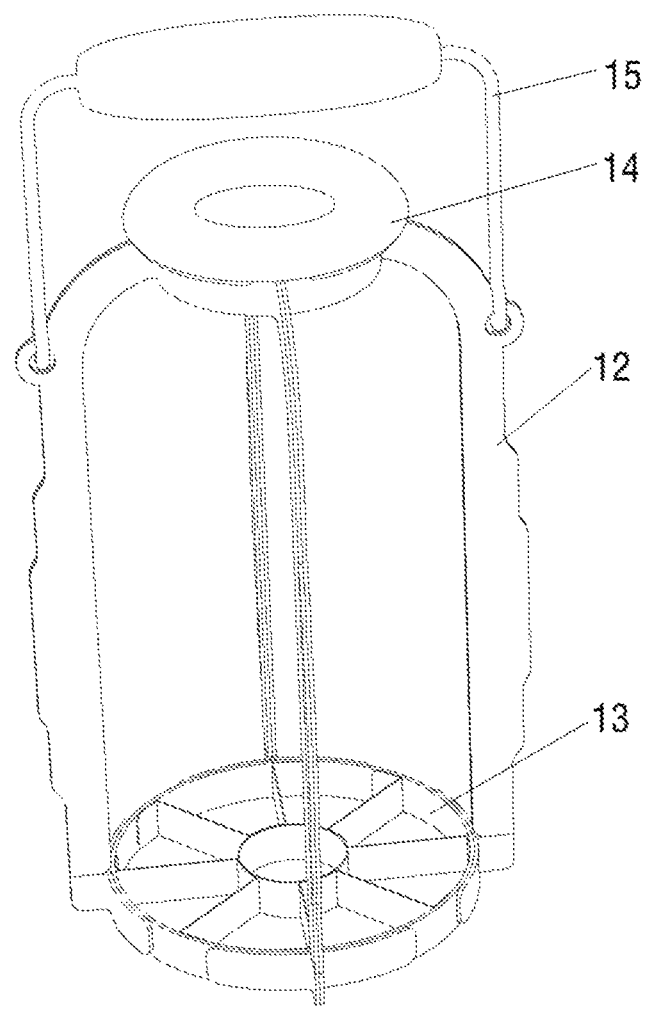
FIG. 5 is a structural schematic diagram of still another embodiment of the invention.

In the embodiment, the multifunctional kitchen utensil has all technical features provided in the embodiment 3 and further comprises a divider used as one of the parts. Shown as FIG. 5, the divider comprises a frame body 12 used for transferring a force, a force-bearing cushion 14 located at the top of the frame body 12 and struck by the hammer body and dividing blades 13 located at the bottom of the frame body 12, the dividing blades 13 are grids which are connected with one another, and the bottoms of the dividing blades are blunt.

Preferably, the frame body 12 is further connected with a holding handle 15.

When making mashed garlic, jam, fruit paste or fruit juice, a user holds the handle with one hand and strikes the force-bearing cushion 14 of the divider with the hammer body, so that vegetables and fruits such as apples, hami-melons and cauliflowers required to be divided are cut open by the dividing blades 13. Of course, the hollow hammer body also can be simply used as a hammer.

The kitchen utensil not only is capable of easily achieving various functions such as functions of peeling and making the fruit paste, but also is safe and reliable and has a certain interestingness, and thus is suitable for children and even infants, and capable of making children find pleasure in the process of making the fruit juice and the fruit paste, enjoy eating by using the kitchen utensil, and further train the coordination skill of hands.

The above embodiments are merely used for illustrating the design concept and features of the invention to make those skilled in the art know about and implement the content of the invention, and the protection scope of the invention is not limited to the above embodiments. Therefore, all equivalent variations or modifications made according to the principle and design ideas disclosed by the invention should fall into the protection scope of the invention.

What is claimed is:

1. A multifunctional kitchen utensil, comprising:
    an upper cup body;
    a lower cup body detachably connected with the upper cup body in a sealed way, wherein a cavity for processing an ingredient is formed by the interior of the upper cup body and the lower cup body, and a hammer body is formed by the exterior of the upper cup body and the lower cup body;
    an upper hoop part configured for sleeving an outer part of the upper cup body and hooping the upper cup body;
    a lower hoop part configured for sleeving an outer part of the lower cup body and hooping the lower cup body, wherein one end of the lower hoop part is hinged with one end of the upper hoop part;
    an upper handle connected with the other end of the upper hoop part;
    a lower handle connected with the other end of the lower hoop part, wherein the lower handle and the upper handle jointly form a handle; and
    a ball arranged in the cavity.

2. The multifunctional kitchen utensil of claim 1, wherein the upper cup body is made of a rigid material; the kitchen utensil further comprises a soft cushion and a mesh screen which are arranged between the upper cup body and the lower cup body, the cavity comprises an upper cavity arranged between the upper cup body and the soft cushion and configured for processing the ingredient, a transition cavity arranged between the soft cushion and the mesh screen and a lower cavity arranged between the mesh screen and the lower cup body and configured for storing juice of the ingredient filtered by the mesh screen; and the ball is located in the upper cavity.

3. The multifunctional kitchen utensil of claim 2, wherein the soft cushion is in a shape of an arch which is bulged towards the upper cup body, and an edge of the soft cushion is provided with a pull ring; and
    the mesh screen is in a shape of an arch which is bulged towards the lower cup body, and an edge of the mesh screen is provided with a pull ring.

4. The multifunctional kitchen utensil of claim 2, wherein the ball is one or a combination of a hollow metal ball, a golf-type ball or a spiky ball.

5. A multifunctional kitchen utensil assembly, comprising:
    a kitchen utensil, comprising:

an upper cup body;

a lower cup body detachably connected with the upper cup body in a sealed way, wherein a cavity for processing an ingredient is formed by the interior of the upper cup body and the lower cup body, and a hammer body is formed by the exterior of the upper cup body and the lower cup body;

an upper hoop part configured for sleeving an outer part of the upper cup body and hooping the upper cup body;

a lower hoop part configured for sleeving an outer part of the lower cup body and hooping the lower cup body, wherein one end of the lower hoop part is hinged with one end of the upper hoop part;

an upper handle connected with the other end of the upper hoop part;

a lower handle connected with the other end of the lower hoop pail, wherein the lower handle and the upper handle jointly form a handle; and a ball arranged in the cavity; and a divider, wherein the divider comprises a frame body configured for transferring a force, a force-bearing cushion located at a top of the frame body and adapted to be struck by the hammer body and dividing blades located at a bottom of the frame body, the dividing blades are grids which are connected with one another, and bottoms of the dividing blades are blunt.

6. The multifunctional kitchen utensil assembly of claim 5, wherein the frame body is further connected with a holding handle.

\* \* \* \* \*